United States Patent
Godwin et al.

(10) Patent No.: US 12,221,367 B2
(45) Date of Patent: Feb. 11, 2025

(54) METHODS OF TREATING WATER WITH POWDER ACTIVATED CARBON TO REDUCE ORGANIC MATTER CONTENT

(71) Applicant: CHEMTREAT, INC., Glen Allen, VA (US)

(72) Inventors: Douglas A. Godwin, Fairhope, AL (US); Alan J. Feller, Macy, IN (US)

(73) Assignee: CHEMTREAT, INC., Glen Allen, VA (US)

(*) Notice: Subject to any disclaimer, the term of this patent is extended or adjusted under 35 U.S.C. 154(b) by 0 days.

(21) Appl. No.: 18/377,029

(22) Filed: Oct. 5, 2023

(65) Prior Publication Data
US 2024/0034653 A1    Feb. 1, 2024

Related U.S. Application Data

(63) Continuation of application No. 17/138,317, filed on Dec. 30, 2020, now Pat. No. 11,814,307.

(60) Provisional application No. 62/987,052, filed on Mar. 9, 2020.

(51) Int. Cl.
| | |
|---|---|
| C02F 1/68 | (2023.01) |
| C02F 1/28 | (2023.01) |
| C02F 1/72 | (2023.01) |
| C02F 103/06 | (2006.01) |
| C02F 103/16 | (2006.01) |

(52) U.S. Cl.
CPC ............ C02F 1/68 (2013.01); C02F 1/281 (2013.01); C02F 1/285 (2013.01); C02F 1/72 (2013.01); C02F 2103/06 (2013.01); C02F 2103/16 (2013.01); C02F 2209/20 (2013.01); C02F 2303/18 (2013.01); C02F 2305/02 (2013.01)

(58) Field of Classification Search
CPC .................................................. C02F 2103/16
See application file for complete search history.

(56) References Cited

U.S. PATENT DOCUMENTS

| | | | | |
|---|---|---|---|---|
| 5,047,083 | A * | 9/1991 | Blake | B01D 17/02 |
| | | | | 134/40 |
| 5,125,966 | A * | 6/1992 | Siefert | C21B 3/04 |
| | | | | 134/40 |
| 2009/0261042 | A1 | 10/2009 | Semiat et al. | |

(Continued)

FOREIGN PATENT DOCUMENTS

| | | | | |
|---|---|---|---|---|
| CA | 3051824 A1 * | 9/2018 | | B01J 20/02 |
| WO | 2019/220258 A1 | 11/2019 | | |

OTHER PUBLICATIONS

Potwara, Robert. "The ABCs of activated carbon." Water Quality Products Magazine February (2012). (Year: 2012).*

(Continued)

*Primary Examiner* — Magali P Slawski
*Assistant Examiner* — Bernadette Karen McGann
(74) *Attorney, Agent, or Firm* — Oliff PLC

(57) ABSTRACT

Methods are described that reduce the amount of organic matter in water, including reducing an amount of total organic carbon in water. The method includes adding powder activated carbon to the water; mixing the powder activated carbon in the water; and separating the powder activated carbon from the water. Also described are a method for reducing glycol content in water containing glycols, and a method for reducing glycol content in a steel mill wastewater stream containing glycols.

16 Claims, 1 Drawing Sheet

(56) References Cited

U.S. PATENT DOCUMENTS

| | | | | |
|---|---|---|---|---|
| 2016/0130160 | A1* | 5/2016 | Baer | C02F 1/283 423/580.1 |
| 2017/0368502 | A1 | 12/2017 | Sjostrom et al. | |
| 2019/0302085 | A1* | 10/2019 | Yano | G01N 31/12 |

OTHER PUBLICATIONS https://www.oilskim.com/industries-and-applications/steel-production.htm (published on Mar. 6, 2019; retrieved on May 19, 2024) ( Year: 2019).*

PAT Report: Steel Industry sludge is being reused (Environmental Science & Technology 1975, 9, 7, 624-625 Publication Date (Print):Jul. 1, 1975) (Year: 1975).*

Jalili, B., Borghei, S.M., Vatanpour, V. and Sarkizi, C., 2018. Optimization of adsorption removal of ethylene glycol from wastewater using granular activated carbon by response surface methodology. Journal of Applied Research in Water and Wastewater, 5(2), pp. 421-430 (Year: 2018).*

Act, C.E.P., 2000. Priority Substances List State of the Science Report for Ethylene Glycol. Environment Canada and Health Canada, Ottawa, Ontario (Year: 2000).*

Jalili et al. "Optimization of adsorption removal of ethylene glycol from wastewater using granular activated carbon by response surface methodology." Journal of Applied Research in Water and Wastewater, vol. 10 (2018) pp. 421-430.

Sep. 6, 2022 International Preliminary Report on Patentability issued in International Patent Application No. PCT/US2020/067496.

Dec. 14, 2023 Search Report issued in European Patent Application No. 20923960.7.

Sep. 8, 2023 Search Report issued in Canadian Patent Application No. 3,167,956.

Potwara, Robert. "The ABCs of Activated Carbon." Water Quality Products, Feb. 2012 issue, pp. 14-15.

"Pat Report: Steel industry sludge is being reused." Environmental Science & Technology, vol. 9, pp. 624-625, 1975.

Mar. 29, 2021 International Search Report issued in International Application No. PCT/US2020/067496.

Ando et al. "Comparison of natural organic matter adsorption capacities of super-powdered activated carbon and powdered activiated Carbon." Water Research, vol. 44 Issue 14 (Jun. 4, 2010) ed carbon and powdered activated Carbon Water Research, vol. 44, pp. 4127-4136, 2010.

Chang et al. "Adsorption kinetics of polyethylene glycol from aqueous solution onto activated carbon." Water Research, vol. 38, pp. 2559-2570, 2004.

Mar. 29, 2021 Written Opinion issued in International Application No. PCT/US2020/067496.

* cited by examiner

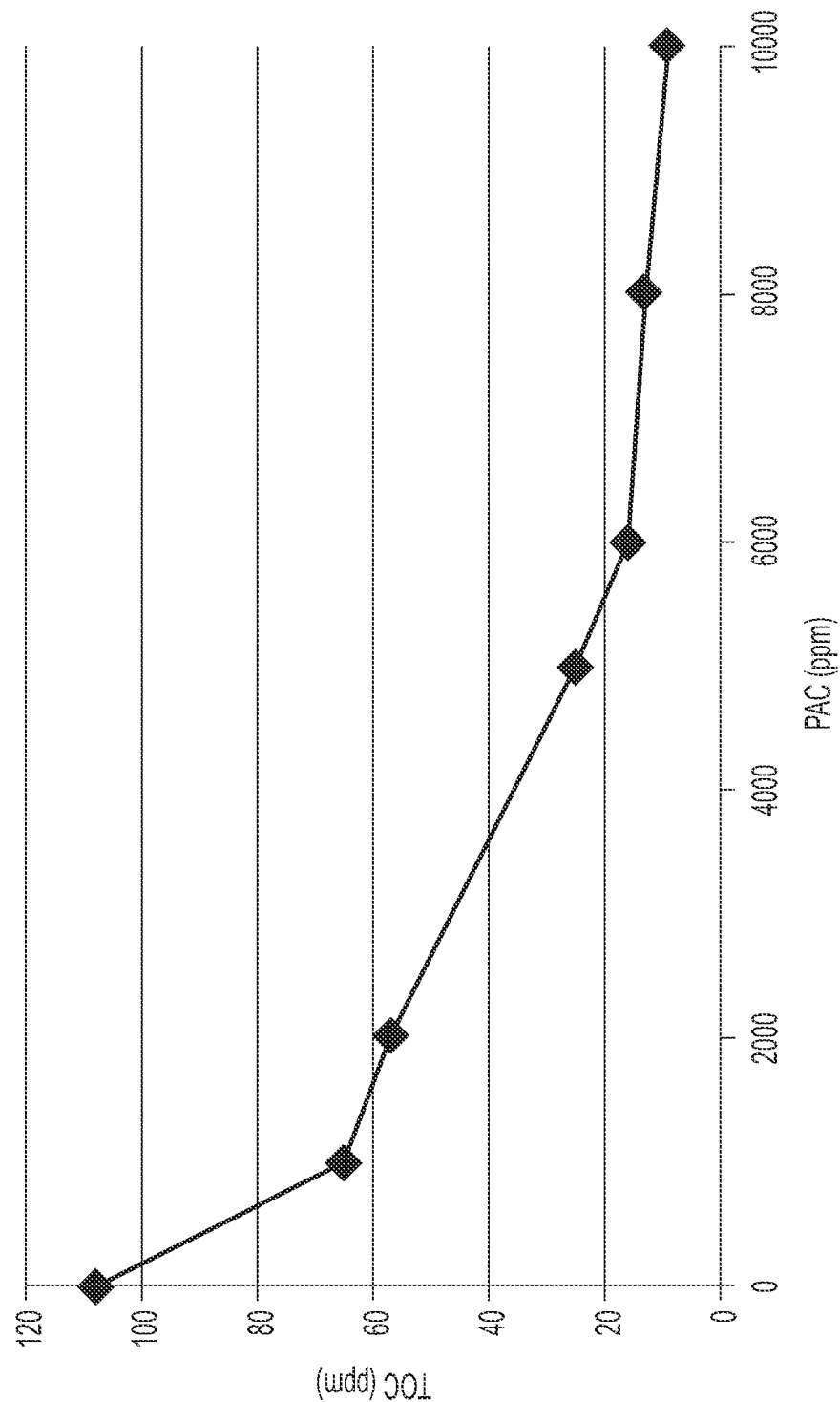

METHODS OF TREATING WATER WITH POWDER ACTIVATED CARBON TO REDUCE ORGANIC MATTER CONTENT

CROSS-REFERENCE TO RELATED APPLICATIONS

This is a Continuation of application Ser. No. 17/138,317, filed Dec. 30, 2020, which in turn claims the benefit of U.S. Provisional Application No. 62/987,052, filed Mar. 9, 2020.

BACKGROUND

Many manufacturing operations can result in periodic accidental and/or anticipated discharges of organic or organic-modified liquids including, for example, hydraulic fluid, heat transfer fluids, and quenching fluids.

These fluids may be used in production operations for many different purposes. For example, steel and other metals may be processed in hot strip or rolling mills that reduce a hot slab, bloom, or billet from a cast shape into thin coils, plates, rebar, or other structural shapes. A typical arrangement is a roughing mill, followed by finishing stands that continuously reduce the cast product into its desired dimensions for final use or additional processing in pickle lines, cold mills, and annealing and cut-to-length lines. The forces required to reduce a cast product to thinner shapes require roll stands with significant pressure requirements (>2000 psi). These pressures are maintained with hydraulic fluids.

From a hydraulics perspective, many industrial machines are designed to operate with fire-resistant hydraulic fluids, particularly water glycol-type hydraulic fluids, due to extremely high operating temperatures. Water glycol fluids usually contain glycols and about 30 to 60 wt % water (e.g., 30-50 wt % water, or 30-40 wt % water). Typical glycols used in such fluids include diethylene glycol, ethylene glycol, propylene glycol, and other polyalkylene glycols or combinations thereof. For example, the water glycol fluid can contain 20-60 wt % or 30-50 wt % diethylene glycol, and/or 5-20 wt % or 10-15 wt % other polyalkylene glycols.

While water is an important part of such water glycol fluids, its presence can also create performance issues for the fluid. Water, for example, does not exhibit the lubricating film strength of mineral oil or various synthetic lubricating base stocks and thus tends to limit the maximum operating pressure of the hydraulic system.

The high water solubility of water glycol fluids can present a range of difficulties in an industrial setting including, for example, establishing adequate control of wastewater discharges from industrial plants and facilities. Local municipalities, as well as state and federal agencies, may monitor water leaving an industrial site for contaminants such as phenol content, FOG (fats, oils, and grease), heavy metals, and CBOD (carbonaceous biological oxygen demand) and COD (chemical oxygen demand).

As noted above, water glycol fluids are used widely throughout various industrial and hydraulic operations and tend to be applied, under high pressures, for actuating various components or for circulating through operating equipment for controlling operating temperature. As a result, leaks or other inadvertent discharges of water glycols during industrial operations are not uncommon. For example, in a steel mill, the hydraulic fluid might be applied at a pressure of 2,500 to 3,000 psi. At these high pressures, a leak can result in hundreds or thousands of gallons of the hydraulic fluid entering the wastewater stream.

Water glycol fluids that find their way into a wastewater stream are typically not removed during standard waste treatment methods and tend to contribute substantially to increased CBOD and COD levels in the effluent stream. The increased CBOD and COD levels can result in significant changes to the biodiversity of the effluent stream. Although anaerobic bacteria can survive—and perhaps thrive—in the presence of the water glycols, the rest of the ecosystem will be depleted as oxygen levels are diminished. As a result, many industrial operations are faced with treatment surcharges from their local wastewater treatment facilities or permit violations due to high levels of CBOD.

To address this, industrial operations have attempted to implement methods for suppressing the impact of inadvertent glycol discharges. However, the glycols are 100% water soluble, and are therefore difficult to remove from water streams because the glycols will not float, cannot be filtered, and are generally not reactive. To date, ultrafiltration and reverse osmosis have been the only measures believed to be effective for removing glycols from wastewater streams. However, these processes are expensive and cumbersome, requiring wastewater to be collected and moved off-site for biological wastewater treatment.

There is a need for a more efficient method for quickly removing glycol contaminants from wastewater streams without requiring off-site treatment.

SUMMARY

In accordance with one aspect of this invention, it has been discovered that powder activated carbon (PAC), previously believed to be ineffective at removing water glycols from water streams, can efficiently reduce glycol-associated contaminants from water streams. The water can be treated on-site (e.g., at a steel mill) without requiring the water to be collected and transferred to an off-site treatment location. This allows for real-time evaluation and treatment of elevated total organic carbon (TOC) in order to ensure that industrial operations comply with regulations governing TOC levels.

In one aspect, this disclosure provides a method for reducing an amount of total organic carbon in water containing more than 25 mg TOC/L water. The method includes adding powder activated carbon to the water; mixing the powder activated carbon in the water; and separating the powder activated carbon from the water.

In another aspect, this disclosure provides a method for reducing glycol content in water containing glycols. The method includes adding powder activated carbon to the water; mixing the powder activated carbon in the water so that at least some of the glycols adsorb onto the powder activated carbon; and separating the powder activated carbon with the adsorbed glycols from the water.

In another aspect, this disclosure provides a method for reducing glycol content in a steel mill wastewater stream containing glycols. The method includes measuring an amount of total organic carbon in the wastewater stream; and, when the measured amount of total organic carbon is greater than a predetermined threshold, adding powder activated carbon to the wastewater stream, mixing the powder activated carbon in the wastewater stream for, and separating the powder activated carbon from the wastewater stream.

BRIEF DESCRIPTION OF THE DRAWING

The FIG. 1s a chart illustrating the effectiveness of PAC on removing glycols (as measured by TOC) using varying concentrations of PAC in a laboratory trial.

It should be noted that this figure is intended to illustrate the general characteristics of methods with reference to certain example embodiments of the invention and thereby supplement the detailed written description below.

DETAILED DESCRIPTION OF EMBODIMENTS

As described herein, methods are provided for reducing the amount of organic matter in a water stream.

The amount of organic matter in a water stream can be measured using various parameters. CBOD is a measurement of oxygen depletion in water as a result of biological activity facilitated by the carbonaceous organic matter in the sample. Higher concentrations of organic matter provide more "food" for microbes, resulting in greater microbial activity and thus greater oxygen depletion. Regulatory bodies generally monitor organic contaminants in industrial wastewater by evaluating CBOD. However, to monitor CBOD, effluent must first be collected and shipped to a treatment site (which can take about 5 days), and the CBOD test itself requires a 5-day period to incubate the sample with microbes. Thus, a glycol leak could go undetected for 10 days before the industrial facility first becomes aware of the problem.

Also, because of the nature of the CBOD test, test results have a large standard deviation, and measurements can vary as much as from 80% to 160% of the actual CBOD. In order to ensure that effluent streams are found to be in compliance with regulations, CBOD must be minimized as much as possible (preferably eliminated) in order to ensure that CBOD tests do not report violating levels of organic matter.

TOC is a related parameter for measuring organic matter, and allows for substantially immediate feedback on amounts of organic matter in the waste stream. TOC provides a measure of the total amount of carbon in a sample through determination of $CO_2$ generation from an oxidation reaction. In other words, while CBOD measures the demand for oxygen, TOC measures the conversion of oxygen to $CO_2$. TOC can be measured real-time, on-site, and with high accuracy. In a steel mill, for example, TOC levels can be monitored at different locations (e.g., caster, flume, scale pit) on a periodic basis. To ensure prompt feedback, measurements can be made every 5-10 minutes. Alternatively, the facility could continuously monitor TOC levels at one or more locations.

Because CBOD and TOC are related, either can be used to measure organic content in the water stream according to the disclosed methods. However, TOC is desirably used due to the ability to get immediate feedback on glycol levels with relatively high accuracy.

In methods of the disclosed embodiments, powder activated carbon (PAC) is introduced into a water stream and contacted with organic matter in the water stream in order to reduce the amount of the organic matter in the water stream. The effectiveness of organic matter (particularly glycol) removal can be determined by monitoring CBOD or TOC. For simplicity, the following discussion refers to monitoring TOC, but CBOD measurements may also be used.

Activated carbon is a highly porous, high-surface-area adsorptive material with a largely amorphous structure. It is composed primarily of carbon atoms joined by random cross-linkages. The randomized bonding creates a highly porous structure with numerous cracks, crevices, and voids between the carbon layers, resulting in a very large internal surface area.

Activated carbon may be in the form of powder activated carbon (PAC), such as powder having a particle size of 80 mesh (177 μm) or smaller. For example, the PAC can have a particle size of 100 mesh (149 μm) or smaller, 140 mesh (105 μm) or smaller, 200 mesh (74 μm) or smaller, 230 mesh (62 μm) or smaller, 270 mesh (53 μm) or smaller, or 325 mesh (44 μm) or smaller. The PAC can be defined by a certain percentage of the particles passing through a given mesh size (e.g., at least 65%, 70%, 75%, 80%, 85%, 90%, 95%, 99%), or can be defined by a series of mesh sizes (e.g., a PAC in which 99% of the particles pass through 100 mesh, 95% pass through 200 mesh, and 90% pass through 325 mesh).

PAC particles can have an average pore size of, for example, 50 nm or less, such as from 2 to 50 nm, 5 to 40 nm, 7.5 to 30 nm, or 10 to 20 nm. Also, the PAC particles can have an iodine value of 600 to 1100, or even more than 1100 (e.g., 1100-1500). The iodine value is an indicator of porosity, and is defined according to ASTM D4607-94 as the milligrams of iodine adsorbed by 1.0 g of the carbon when the iodine concentration of the filtrate is 0.02 mol/L.

The apparent density of the PAC can range from 22 to 35 lb/ft$^3$, such as 25 to 31 lb/ft$^3$. For example, the PAC can have an apparent density of 29 lb/ft$^3$.

In embodiments of the invention, PAC can be injected into the water stream in either powder form or as a slurry. For example, the PAC can be mixed with water in a batch tank to form a slurry containing 0.01 to 10 lbs PAC per gallon water. For example, the concentration of PAC in the slurry could be 0.025 to 5 lbs PAC per gallon water, 0.05 to 2 lbs PAC per gallon water, or 0.1 to 1 lb PAC per gallon water. The slurry can be held in the tank, i.e., pre-made, or formed continuously and as needed. The PAC can then be injected into the system (either in powder form or as a slurry) in response to detected elevated TOC levels. This process of injecting the PAC in response to reaching a TOC threshold (e.g., 20 or 30 ppm) can be automated or performed manually.

Effective PAC dosing will depend on TOC levels. Treatment levels and dosing will vary depending on system configuration and CBOD permit limitations. Depending on system dynamics, the feed rate can be between 25 and 50 lbs of PAC per gallon of glycol. A total treatment amount of 10 to 1,000 lbs of PAC can be injected into the water stream for every 1 lb of TOC introduced in the water stream. For example, 50 to 800 lbs of PAC, 200 to 400 lbs PAC, 225 to 350 lbs PAC, or 250 to 300 lbs PAC can be added for every 1 lb of TOC. Depending on TOC levels and effluent flow rate, the PAC feed rate can be from 5 to 20 lb/min, from 7.5 to 15 lb/min, or from 10 to 12 lb/min.

In the case of a hydraulic fluid leak, glycol levels can range from 5 to 100 gallons glycol/100 lb TOC (for example, 20 to 50 gallons glycol/100 lb TOC, or 30 to 40 gallons glycol/100 lb TOC). The amount of fluid leaked into the system can depend on different factors such as flow rate and how long the leak progressed until it was detected. For example, a leak can introduce 50 lb, 100 lb, 150 lb, 300 lb, 750 lb, or more TOC into the system. TOC levels at the time of initiating treatment can be lower if detected early (e.g., 30 or 50 mg TOC/L water), or can be as high as 100 mg/L, 150 mg/L, 200 mg/L, 500 mg/L or higher.

Average TOC levels after 24 hours of treatment should ideally be lower than 25 mg/L, and preferably lower than 20 mg/L or lower than 15 mg/L. Treatment could result in complete removal of TOC or a decrease in average amount of TOC over the course of 24 hours. For example, the detected amount can decrease by 50%, 60%, 80%, 90%, 95%, or 99% over the course of treatment (e.g., within 24 hours from start of treatment).

The total treatment amount of PAC added with respect to glycol spilled into the system can be up to 100 lb PAC/gallon glycol, e.g. from 5 to 100 lb PAC/gallon glycol, from 20 to 90 lb PAC/gallon glycol, from 50 to 80 lb PAC/gallon glycol, or from 65 to 75 lb PAC/gallon glycol. For example, the amount of PAC introduced can be about 70 lb PAC/gallon glycol.

In some aspects, to ensure sufficient interaction between the PAC and glycols, the PAC can be allowed to mix with the water containing organic matter (TOC) for a certain amount of time before being separated, such as for 1-5 minutes. For example, the PAC can be mixed into a water stream containing organic matter (where turbulent flow effectively mixes the PAC into the water stream) for at least 3 minutes, at least 5 minutes, at least 10 minutes, at least 30 minutes, or at least 60 minutes prior to being allowed to settle. Or the PAC can be mechanically mixed with water containing organic matter in a tank for any of these mixing times.

In the case of a steel mill, the PAC can be added in the flume that leads to the scale pit or other clarification systems. The PAC is sufficiently mixed with the wastewater in the flume or other piping prior to the scale separating system, where it then settles together with the adsorbed glycols. In this case, the mixing time refers to the amount of time the PAC spends in the flume, mixing chamber, or piping before reaching the scale pit or other devices where it is allowed to settle. The settled PAC/glycols are removed from the scale pit, settler, dissolved air flotation (DAF) device, or other separation device, together with steel scale, and the clarified water can be recirculated.

The settled PAC/glycols can remain in the scale, which can be removed and recycled or disposed per normal handling processes.

EXAMPLE

The following test was performed to demonstrate the effectiveness of the disclosed methods, and particularly to confirm the effect of various concentrations of PAC on treating TOC.

A control solution contained 108 ppm TOC (~318 ppm glycol) in water. The glycol product used was FR WG 300-D from American Chemical Technologies, Inc., and included 35-45 wt % diethylene glycol, 30-40 wt % water, 10-15 wt % polyalkylene glycol, morpholine, and 0-1 wt % diethanolamine. Test samples were prepared from the control solution by adding varying amounts of PAC, ranging from 1,000 ppm (0.1 wt %) to ppm (1 wt %) PAC, and mixing the samples for 3-5 minutes. The samples were allowed to settle for approximately 20 minutes, and 50 mL of water was decanted from the top of each sample and analyzed using a Teledyne TOC analyzer. Minimal PAC was included in the 50 mL aliquots due to settling; however, any incidental amounts of PAC present in the samples is believed to have not affected the TOC analysis.

The results are summarized in the FIGURE. As shown, TOC levels decrease with increasing amounts of PAC. However, it becomes increasingly difficult to mitigate TOC levels below 30 ppm TOC. This demonstrates that PAC must be dosed carefully to ensure that TOC levels remain below regulated thresholds (which can require less than 20 or 30 ppm TOC).

As shown in the Example, PAC was surprisingly found to be effective for reducing TOC (and CBOD) when allowed to adequately mix with the water containing organic matter. Using the disclosed methods, water can be treated on-site (e.g., at a steel mill or airport deicing runoff) without requiring the water to be collected and transferred to an off-site treatment location. This allows for real-time evaluation and treatment of elevated amounts of organic matter (measured as TOC or CBOD) in order to ensure that industrial operations comply with environmental regulations.

While the invention has been described in conjunction with the specific exemplary embodiments thereof, it is evident that many alternatives, modifications, and variations will be apparent to those skilled in the art. Accordingly, exemplary embodiments of the invention as set forth herein are intended to be illustrative, not limiting. There are changes that may be made without departing from the spirit and scope of the invention.

What is claimed is:

1. A method for treating a steel mill wastewater stream at a steel mill, the method comprising:
   measuring an amount of total organic carbon (TOC) in the steel mill wastewater stream;
   determining whether a glycol spill has occurred at the steel mill based on the measured amount of TOC in the steel mill wastewater stream; and
   treating the steel mill wastewater stream by:
   adding powder activated carbon to the steel mill wastewater stream in an amount based on the measured amount of TOC in the steel mill wastewater stream;
   mixing the powder activated carbon in the steel mill wastewater stream; and
   separating the powder activated carbon from the steel mill wastewater stream.

2. The method of claim 1, wherein determining whether a glycol spill has occurred comprises detecting at least one glycol species in the steel mill wastewater stream.

3. The method of claim 1, wherein the powder activated carbon is added to the steel mill wastewater stream in the form of a slurry comprising from 0.01 to 10 lbs powder activated carbon per gallon water.

4. The method of claim 1, wherein the amount of powder activated carbon added to the steel mill wastewater stream is in the range of from 50 to 800 lbs powder activated carbon per 1 lb TOC in the steel mill wastewater stream.

5. The method of claim 1, wherein the amount of powder activated carbon added to the steel mill wastewater stream is in the range of from 200 to 400 lbs powder activated carbon per 1 lb TOC in the steel mill wastewater stream.

6. The method of claim 1, wherein the powder activated carbon has an iodine value of at least 1100.

7. The method of claim 1, wherein the powder activated carbon has an apparent density in the range of from 22 lb/ft$^3$ to 35 lb/ft$^3$.

8. The method of claim 1, wherein the steel mill wastewater stream having the glycol spill comprises 5 to 100 gallons glycol/100 lb TOC before the powder activated carbon is added.

9. The method of claim 1, wherein treating the steel mill wastewater stream comprises reducing the amount of TOC in the steel mill wastewater stream by at least 50% within 24 hours from when the powder activated carbon is first added to the steel mill wastewater stream.

10. The method of claim 1, wherein the steel mill wastewater stream is treated until the amount of TOC in the steel mill wastewater stream is reduced to 20 mg TOC/L water or less.

11. The method of claim 2, wherein the at least one glycol species comprises polyalkylene glycol.

12. The method of claim 2, wherein the at least one glycol species comprise at least one glycol species selected from the group consisting of diethylene glycol, ethylene glycol, and propylene glycol.

13. The method of claim 1, wherein the amount of powder activated carbon added to the steel mill wastewater stream is in the range of from 5 to 100 lbs powder activated carbon per gallon glycol spilled into the steel mill wastewater stream.

14. The method of claim 1, wherein the amount of powder activated carbon added to the steel mill wastewater stream is in the range of from 20 to 90 lbs powder activated carbon per gallon glycol spilled into the steel mill wastewater stream.

15. The method of claim 1, wherein the amount of powder activated carbon added to the steel mill wastewater stream is in the range of from 50 to 80 lbs powder activated carbon per gallon glycol spilled into the steel mill wastewater stream.

16. The method of claim 1, wherein the treating further comprises:
- detecting a change in the amount of TOC in the steel mill wastewater stream; and
- adjusting the amount of powder activated carbon added to the steel mill wastewater stream based on the detected change.

\* \* \* \* \*